United States Patent
Ebeida

(10) Patent No.: US 10,304,243 B1
(45) Date of Patent: May 28, 2019

(54) GENERATING AN IMPLICIT VORONOI MESH TO DECOMPOSE A DOMAIN OF ARBITRARILY MANY DIMENSIONS

(71) Applicant: National Technology & Engineering Solutions of Sandia, LLC, Albuquerque, NM (US)

(72) Inventor: Mohamed Salah Ebeida, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 7 days.

(21) Appl. No.: 15/634,750

(22) Filed: Jun. 27, 2017

(51) Int. Cl.
*G06T 17/20* (2006.01)
*G06K 9/62* (2006.01)
*G06F 17/50* (2006.01)

(52) U.S. Cl.
CPC .......... *G06T 17/20* (2013.01); *G06F 17/5009* (2013.01); *G06K 9/6276* (2013.01); *G06K 9/6286* (2013.01); *G06F 2217/16* (2013.01)

(58) Field of Classification Search
None
See application file for complete search history.

(56) References Cited

U.S. PATENT DOCUMENTS

| | | | |
|---|---|---|---|
| 8,212,814 B2 | 7/2012 | Branets et al. | |
| 8,674,984 B2 | 3/2014 | Ran et al. | |
| 8,818,780 B2 | 8/2014 | Calvert et al. | |
| 9,103,194 B2 | 8/2015 | Khvoenkova et al. | |
| 2002/0181751 A1* | 12/2002 | Hale | G06T 17/20 382/128 |
| 2015/0260017 A1 | 9/2015 | Ding et al. | |

OTHER PUBLICATIONS

Ebeida, M., Rushdi, A., Recursive Spoke Darts: Local Hyperplane Sampling for Delaunay and Voronoi Meshing in Arbitrary Dimensions, Sep. 2016, 25th International Meshing Roundtable, vol. 163, pp. 110-122. (Year: 2016).*

* cited by examiner

*Primary Examiner* — Said Broome
(74) *Attorney, Agent, or Firm* — Medley, Behrens & Lewis, LLC

(57) ABSTRACT

Described herein are technologies pertaining to generating a Voronoi mesh for an enclosed domain of arbitrarily many dimensions. An implicit Voronoi mesh is received that comprises locations of seeds in the domain. Neighbors of a seed are identified by extending a segment from the seed to the boundary of the domain and performing successive hyperplane trimming of the segment to identify a point on the facet of the Voronoi cell of the seed. A vertex of the cell can be identified by successively extending and trimming one or more additional spokes to identify points on a facet of the cell that are constrained to lie in a (d–n) space, where d is a number of dimensions of the domain and n is a number of iterations. A numerical simulation is performed based on the Voronoi mesh to generate simulation results in applications including surrogate modeling, global optimization, calibration, dimension reduction.

20 Claims, 15 Drawing Sheets

GENERATING AN IMPLICIT VORONOI MESH TO DECOMPOSE A DOMAIN OF ARBITRARILY MANY DIMENSIONS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Subdividing a domain into a finite number of elements is desirable in numerous technical fields. For example, it is desirable to decompose a domain into a finite number of elements in connection with performing uncertainty quantification (UQ) and global optimization in applications such as multiscale material modeling and aerodynamic analysis. Robustness of conventional processes for performing domain decomposition is not trivial. Generally, domain decomposition breaks down a domain into a finite number of cells with certain desired properties, such as positive Jacobian, convex elements, and planar facets. A domain decomposition also defines how a point in the domain is assigned to a cell, and how each cell in the domain decomposition identifies cells in close proximity thereto.

Several different approaches have been proposed for performing domain decomposition over enclosed domains. These approaches, however, are associated with numerous deficiencies. In particular, conventional Voronoi domain decomposition (VDD) approaches rely on techniques such as successive hyperplane trimming in order to construct Voronoi cells. These techniques generally suffer from a curse of dimensionality, where as a number of dimensions of the domain increases, the computations required to construct the Voronoi cells increase exponentially.

SUMMARY

The following is a brief summary of subject matter that is described in greater detail herein. This summary is not intended to be limiting as to the scope of the claims.

Described herein are various technologies pertaining to performing Voronoi domain decomposition (VDD) for high-dimensional domains (e.g., enclosed domains having greater than three dimensions). More particularly, a computing system generates or receives an implicit definition of a Voronoi mesh for an enclosed domain. For example, the implicit definition of the Voronoi mesh comprises locations of a plurality of Voronoi seeds, wherein points in the domain are assigned to a Voronoi cell based on the locations of the seeds. Although the Voronoi mesh is completely defined by the locations of the seeds (e.g., knowledge of the locations of the seeds is sufficient to determine to which Voronoi cell each point in the domain belongs), numerical simulations based upon a domain decomposition generally require information about which cells are neighbors. Knowing which cells are neighbors makes it possible to provide innovative solutions to complex problems, even in high-dimensional spaces, including the following scientific and engineering problems: 1) Piecewise surrogate modeling: Building local interpolatory approximations based on information available at neighbors only, rather than all points in the domain. This has several consequences on improving accuracy and stability of global surrogate methods, especially when the underlying function exhibits discontinuities. 2) Global optimization: Being able to know Voronoi vertices makes it possible to adaptively add samples in proximity to the vertices for faster convergence towards some optimal point. This approach has several advantages over existing global optimization techniques such as DIRECT, which divides the domain into rectangles rather than Voronoi cells and faces several computational challenges. 3) Calibration and Posterior Sampling: Re-defining the posterior estimation problem as a global optimization problem makes it possible to efficiently solve it. A surrogate model can be constructed on top of the approximated posterior probability density function, consequently making it possible to generate new samples from that function based on the likelihood of the Voronoi cells that were used to approximate the posterior function. This approach is advantageous over the costly Markov chain Monte Carlo (MCMC) approach. 4) Automatic Discontinuity Detection: Several high-dimensional functions or numerical simulations exhibit problematic discontinuities. Dealing with discontinuities as sharp angles in the implicitly constructed Voronoi mesh makes it possible to automatically predict the boundaries of those discontinuities. 5) Local Dimension Reduction: In high-dimensional spaces, reducing dimensionality by ignoring directions where the underlying function does not change much is critical for the efficiency of computational simulations. This becomes a problem when it is not easy to find those inactive directions. Knowing which cells are neighbors in the implicit Voronoi mesh makes it possible for each Voronoi mesh to seek a local dimension reduction within its own boundaries, overcoming global non-linearities as well as discontinuous behavior of the underling function.

In order to identify which cells are neighbors, the computing system performs hyperplane sampling to locate points on facets of Voronoi cells, where such points are indicative of one or more neighbor cells. By way of example, in connection with identifying neighbor cells of a first Voronoi cell in the Voronoi mesh, the computing system extends a spoke in a random direction from the seed of the first Voronoi cell to the boundary of the enclosed domain. The computing system then performs a nearest-neighbor search to identify a closest seed to the end point of the spoke. The closest seed to the end point identifies a cell in which the end of the spoke is located. The computing system identifies a point of intersection between the spoke and a hyperplane that bisects the distance between the seed of the first Voronoi cell and the seed that is closest to the end point of the spoke. The computing system then performs another search to identify the seed closest to this point of intersection. If the seed that is closest to the point of intersection is the same as the seed that is the closest seed to the end point of the spoke, the computing system labels that seed as a neighbor of the seed of the first Voronoi cell. If the seed that is closest to the point of intersection is not the same as the seed that is closest to the end point of the spoke, the computing system trims the spoke to the point of intersection. The computing system then uses the point of intersection as the new end point of the spoke, and repeats the process of identifying a new point of intersection between the spoke and a new hyperplane that bisects the distance between the seed of the first Voronoi cell and the seed that is closest to the new end point of the spoke.

Once the computing system determines that the seed closest to the end point of the spoke and the seed closest to the point of intersection between the spoke and the bisecting hyperplane are the same seed, the computing system labels that seed as a neighbor of the seed of the first Voronoi cell. The computing system can further label the intersection point as being on a facet of the first Voronoi cell, the facet having dimensionality of d−1, where d is the dimensionality of the domain. Upon labeling the intersection point as being on the facet of the first Voronoi cell, the computing system can extend a spoke from the first seed in a different random direction from the first spoke, and repeat the process described above to identify another neighbor of the first cell. These steps can be repeated a plurality of time to identify additional neighbor cells of the first cell. Repeated sufficiently many times, this process can be used to identify significant neighbor cells of the first cell.

In order to ensure that all neighbor cells of the first Voronoi cell are identified, the computing system can use a point identified as being on a facet of the first Voronoi cell to identify vertices of the first Voronoi cell. In an exemplary embodiment, responsive to labeling the intersection point as being on the facet of the first Voronoi cell, the computing system extends a second spoke along the facet to the boundary of the domain. The computing system then performs the successive trimming operations described above until a seed closest to the end point of the second spoke and a seed closest to the point of intersection between the second spoke and a second hyperplane that bisects the distance between the first seed and the seed closest to the end point of the second spoke are the same seed. This point of intersection between the second spoke and the second hyperplane is labeled as being on a facet of one dimension less than the number of dimensions of the previously-identified facet. Each time a spoke is trimmed in this way, the spoke is constrained to move along the facet identified in the previous iteration, thereby reducing the dimensionality of the spoke by one from one iteration to the next. By way of example, in three dimensions a point is first identified on the two-dimensional facet of the first Voronoi cell by way of trimming a spoke extending in three dimensions. In a subsequent spoke trimming operation, a second point is identified as being on a one-dimensional edge of the first Voronoi cell using a spoke that extends in the two dimensions of the facet. In another subsequent spoke trimming operation, a third point is identified as being a vertex of the first Voronoi cell using a spoke that extends along the one dimension of the edge of the first Voronoi cell.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
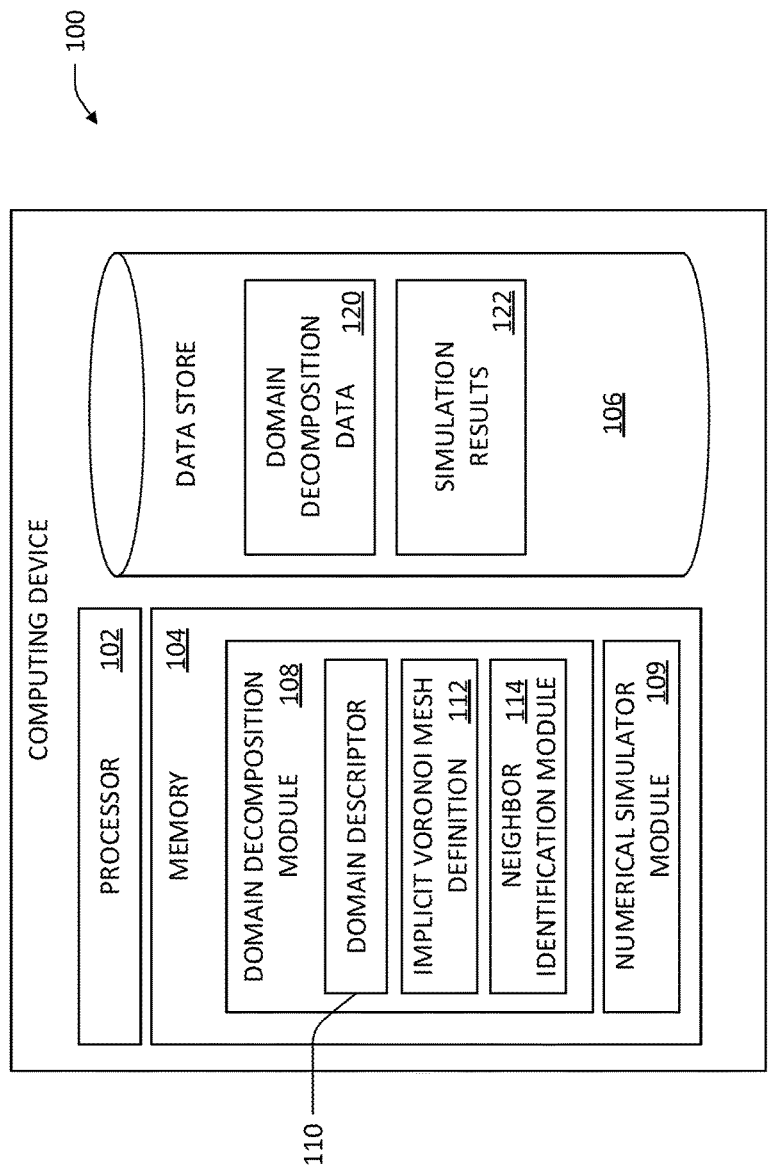
FIG. 1 is a functional block diagram of an exemplary computing device that is configured to perform numerical simulation based on an implicitly-defined Voronoi mesh.

Various technologies pertaining to performing Voronoi domain decomposition (VDD) for high-dimensional domains are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, a functional block diagram of an exemplary computing device 100 that facilitates performing Voronoi domain decomposition for high-dimensional domains is illustrated. The computing device 100 includes a processor 102 and memory 104 that is operably coupled to the processor 102. The computing device 100 also includes a data store 106 that is operably coupled to the processor 102 and/or the memory 104. The memory 104 has loaded therein a domain decomposition module 108 that is configured to perform VDD with respect to an enclosed d-dimensional domain. The memory 104 further has loaded therein a numerical simulator module 109 that performs a numerical simulation based on a Voronoi mesh of the enclosed domain.

The domain decomposition module 108 receives a domain descriptor 110 that defines the above-mentioned enclosed domain. The domain descriptor 110, for example, may be a computer-based file that includes an electronic representation of the enclosed domain. More specifically, the domain descriptor 110 comprises data indicative of bounds of the domain in each of a plurality of d dimensions. The domain decomposition module 108 further receives an implicit Voronoi mesh definition 112 that defines a conforming Voronoi mesh. The implicit Voronoi mesh definition 112 includes sufficient information to generate a Voronoi mesh for the enclosed domain without including mesh data for every point in the domain. For example, the implicit Voronoi mesh definition 112 can comprise a location for each of a plurality of Voronoi seeds, wherein the Voronoi mesh is based on the locations of the seeds. The locations of the seeds completely define the Voronoi mesh in that the Voronoi cell or cells to which every point in the domain belong can be determined based solely on the locations of the seeds. In some exemplary embodiments, the domain decomposition module 108 can generate the implicit Voronoi mesh definition based on the domain descriptor 110.

The domain decomposition module 108 further comprises a neighbor identification module 114 that is configured to identify neighborhood information for Voronoi cells in the Voronoi mesh defined by the implicit Voronoi mesh definition 112. By way of example, the neighbor identification module 114 can identify neighbor seeds of a seed of interest in the Voronoi mesh. A seed's Voronoi cell shares a facet with the corresponding Voronoi cell of each of the seed's neighbor seeds. Information about which seeds are neighbors is usable in connection with performing various numerical simulations in connection with uncertainty quantification and global optimization. Unlike conventional computing systems, the computing device 100 is configured to identify neighbor seeds of a seed of interest without characterizing every Voronoi vertex in the mesh. Thus, the computing device 100 avoids the curse of dimensionality associated with conventional approaches to performing numerical simulations based on high-dimensional Voronoi meshes that result from the exponential increase in the number of Voronoi vertices as the number of dimensions of the domain increases.

Operation of the computing device 100 in connection with performing a numerical simulation based upon a VDD of a high-dimensional domain is now described. The domain decomposition module 108 receives the domain descriptor 110. Responsive to receiving the domain descriptor 110, the domain decomposition module 108 generates the implicit Voronoi mesh definition 112. Alternatively, the domain decomposition module 108 can receive the Voronoi mesh definition 112 from other modules of the computing device 100, or from another computing device. The neighbor identification module 114 identifies neighbor seeds of a seed of interest based on a hyperplane sampling technique of iterative line-hyperplane trimming operations. The neighbor identification module 114 extends a spoke from the seed of interest to the boundary of the enclosed domain, wherein the spoke is a line segment in the d-dimensional space of the enclosed domain. The neighbor identification module 114 identifies a seed closest to the end point of the spoke. The neighbor identification module 114 constructs a segment spanning the distance between the seed of interest and the seed closest to the end point of the spoke. The neighbor identification module 114 generates a hyperplane that bisects the constructed segment and identifies an intersection point of the hyperplane and the spoke. If the seed that is closest to the intersection point is the same seed that is closest to the end point of the spoke, then that seed and the seed of interest are labeled as being neighbors by the neighbor identification module 114. The labels can be added to the implicit Voronoi mesh definition 112 and stored as domain decomposition data 120 in the data store 106. The numerical simulator module 109 can then perform one or more numerical simulations based on the labeling of the seeds as neighbors. Results of the numerical simulation are then stored as simulation results 122. Operation of the computing device 100 generally and the domain decomposition module 108 specifically is described in greater detail below with respect to FIGS. 2-14.

FIGS. 2-3, 8, and 11 illustrate exemplary methodologies relating to identifying neighbor seeds of a seed in a Voronoi mesh based on an implicit definition of the Voronoi mesh. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 2:
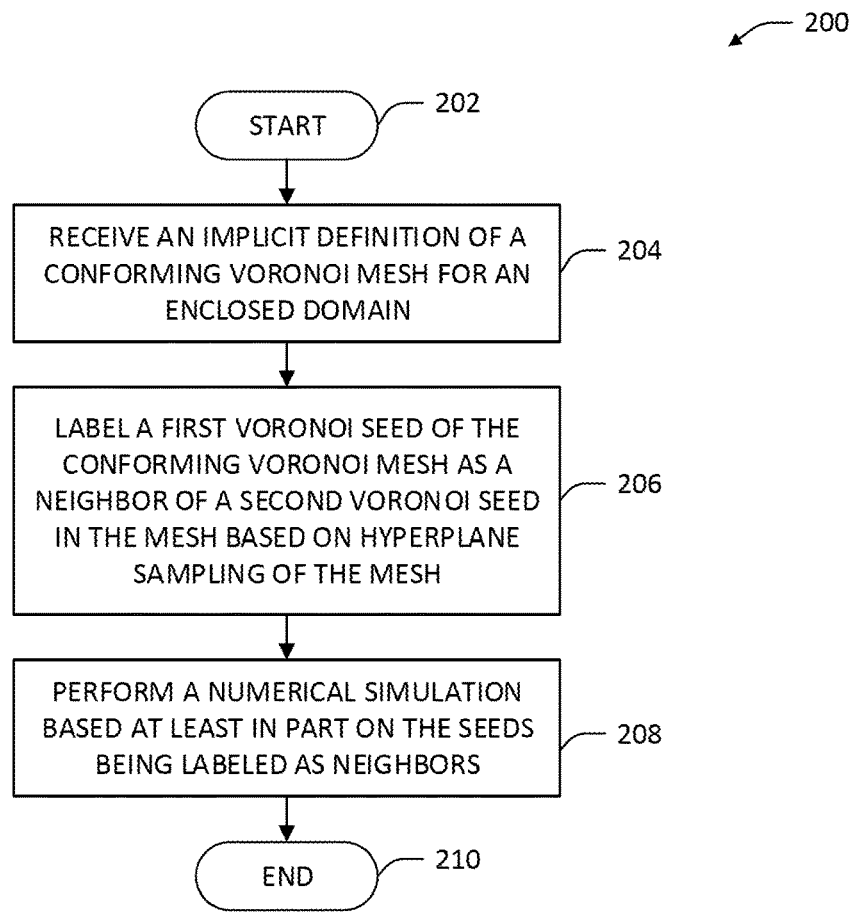
FIG. 2 is a flow diagram illustrating an exemplary methodology for performing a numerical simulation based on an implicitly-defined Voronoi mesh.

Referring now to FIG. 2, a methodology 200 that is performed by the computing device 100 is illustrated. The methodology 200 begins at 202, and at 204 an implicit definition of a conforming Voronoi mesh for an enclosed domain is received. At 206, a first Voronoi seed of the mesh is labeled as a neighbor of a second seed in the mesh based on hyperplane sampling of the mesh, wherein the hyperplane sampling is based on the implicit definition of the Voronoi mesh received at 204. At 208 a numerical simulation is performed to generate simulation results based at least in part on the first and second seeds being labeled as neighbors, whereupon the methodology 200 ends at 210.

Figure 3:
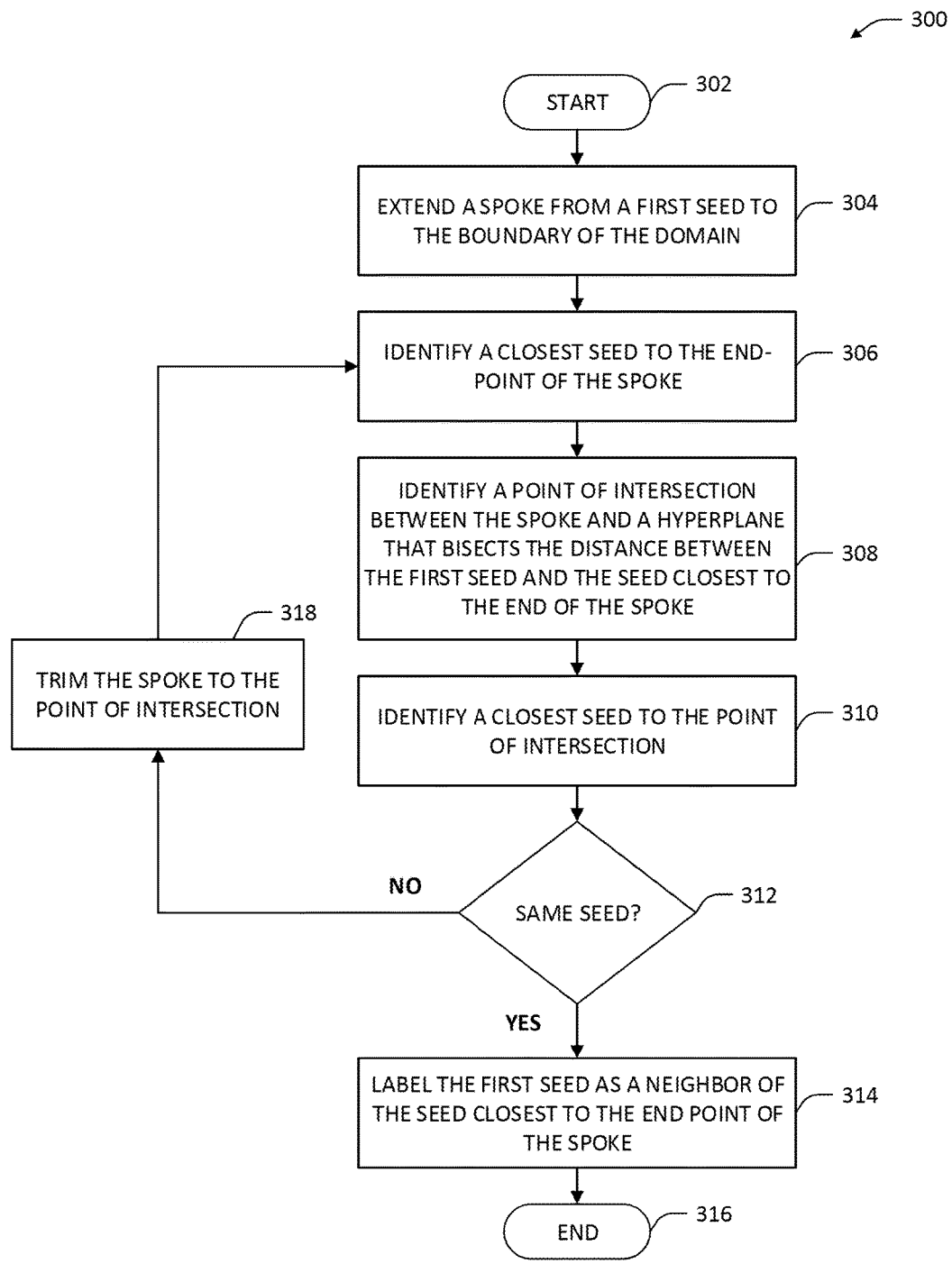
FIG. 3 is a flow diagram illustrating an exemplary methodology for labeling seeds in an implicitly-defined Voronoi mesh as neighbors.

Referring now to FIG. 3, a methodology 300 for hyperplane sampling that is performed by the computing device 100 in connection with identifying neighbor seeds based on the implicit Voronoi mesh definition 112 of the enclosed domain is illustrated, wherein the Voronoi mesh definition 112 comprises locations of a plurality of seeds for the Voronoi mesh. The methodology 300 begins at 302, and at 304 a spoke is extended from a first seed to the boundary of the domain. In an example, the spoke is extended from the first seed in a random direction until the spoke reaches the boundary of the domain. At 306, a closest seed to the end-point of the spoke is identified. At 308, a point of intersection between the spoke and a hyperplane that bisects the distance between the first seed and the seed closest to the end of the spoke is identified. Responsive to the point of intersection being identified at 308, the seed closest to the point of intersection is identified at 310.

At 312, a determination is made as to whether the seed closest to the point of intersection (identified at 310) and the seed closest to the end-point of the spoke (identified at 306) are the same seed. If the seeds are the same seed, then the methodology 300 proceeds to 314 and the first seed is labeled as a neighbor of the seed closest to the end-point of the spoke, whereupon the methodology 300 ends 316.

If it is determined at 312 that the seeds are not the same seed, then the methodology 300 proceeds to 318 where the spoke is trimmed to the point of intersection, whereafter the spoke extends from the first seed to the point of intersection identified at 308. The methodology 300 then returns to 306, where a new closest seed to the end-point of the now-trimmed spoke is identified. At 308 a point of intersection is identified between the trimmed spoke and a new hyperplane that bisects the distance between the first seed and the new seed closest to the end of the spoke. The closest seed to this new point of intersection is then identified at 310, whereupon the determination is made whether the seed closest to the new point of intersection and the seed closest to the new end point of the spoke are the same seed at 312. The acts of trimming the spoke 318, identifying the closest seed to the end point of the spoke 306, identifying the point of intersection 308, and identifying the closest seed to the point of intersection 310 are repeated until it is determined at 312 that the seeds are the same seed, whereupon the first seed and the seed closest to the end point of the spoke are labeled as neighbors 314 and the methodology 300 ends 316.

Figure 4:
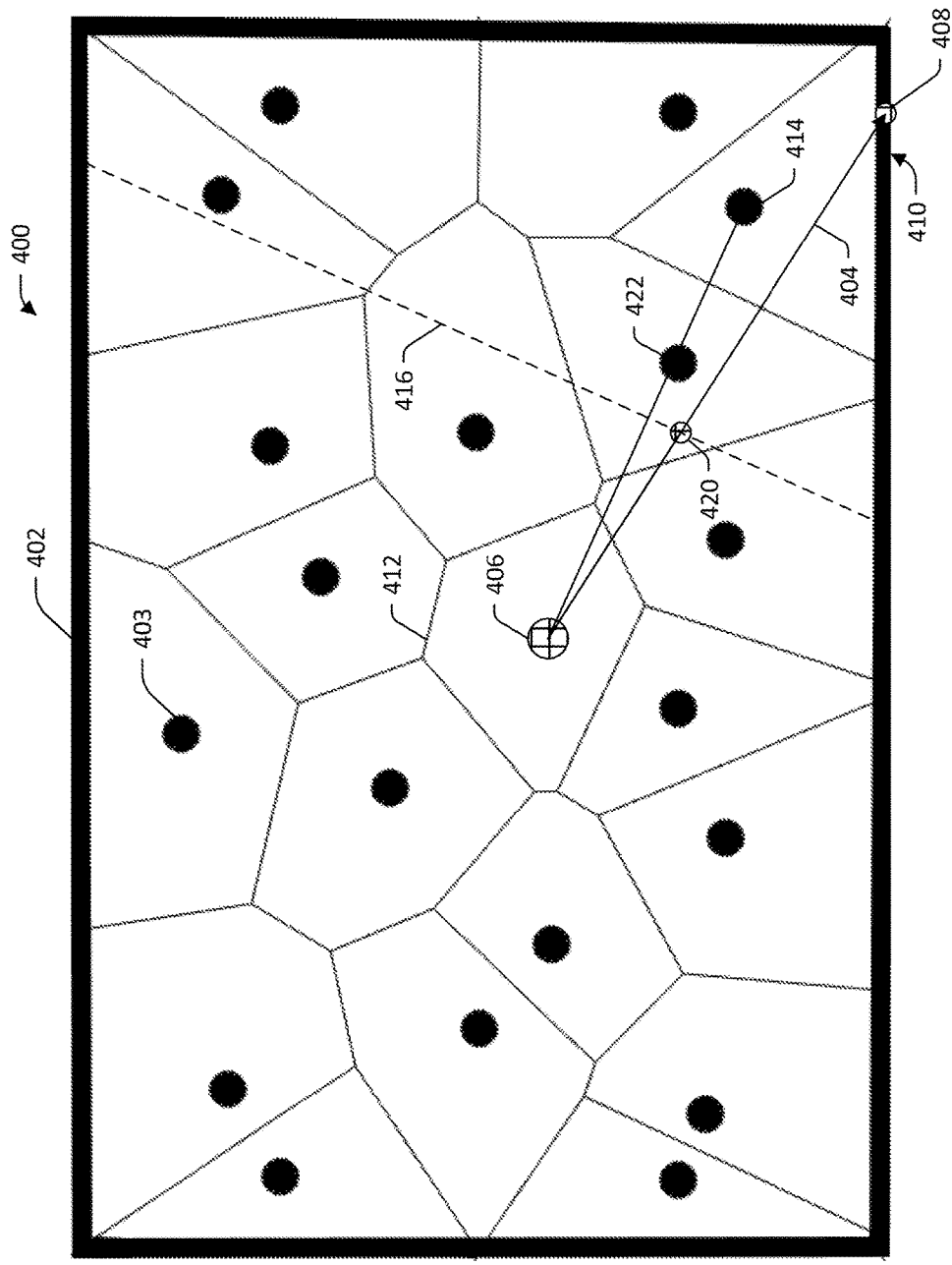
FIG. 4 is a diagram illustrating certain exemplary operations performed by a computing device in connection with identifying neighbor seeds in an implicitly-defined Voronoi mesh of an enclosed domain.
Figure 5:
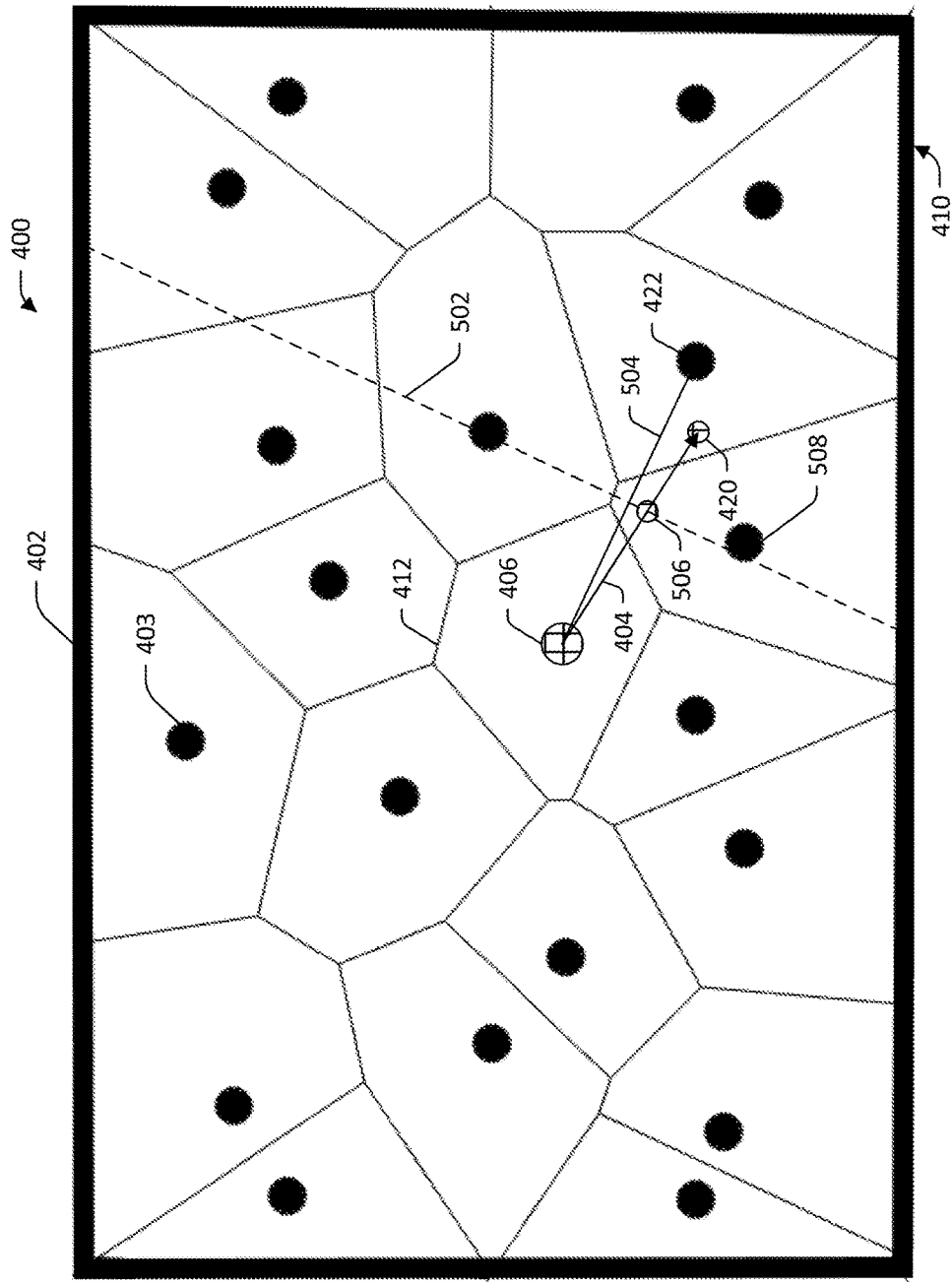
FIG. 5 is a diagram illustrating certain further exemplary operations performed by a computing device in connection with identifying neighbor seeds in an implicitly-defined Voronoi mesh of an enclosed domain.
Figure 6:
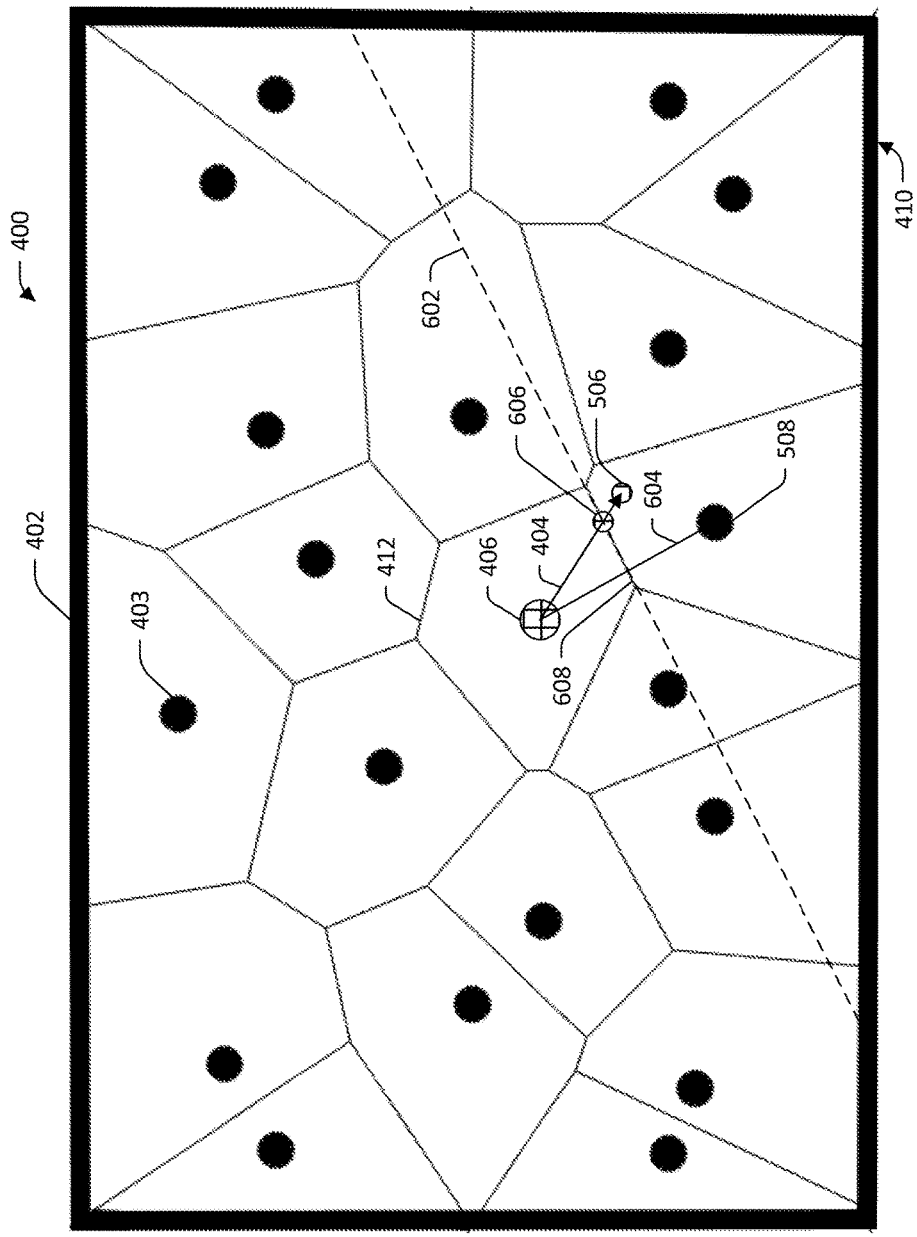
FIG. 6 is a diagram illustrating still further certain exemplary operations performed by a computing device in connection with identifying neighbor seeds in an implicitly-defined Voronoi mesh of an enclosed domain.

By way of example, and referring now to FIGS. 4-6, exemplary diagrams that depict operation of the methodology 300 with respect to an enclosed domain are illustrated. While FIGS. 4-6 depict the operation of the methodology 300 with respect to a two-dimensional domain, it is to be understood that the technologies described herein are suitable for application to domains of arbitrarily many dimensions.

Referring now solely to FIG. 4, an exemplary Voronoi mesh 400 of an enclosed domain 402 is illustrated. The Voronoi mesh 400 comprises a plurality of seeds 403, wherein locations of the seeds 403 completely determine boundaries of cells in the Voronoi mesh 400. The neighbor identification module 114 extends a spoke 404 from a first seed 406 to a point 408 at the boundary 410 of the domain 402. The first seed 406 corresponds to a Voronoi cell 412, wherein all points within the Voronoi cell 412 are closer to the first seed 406 than any other seed in the Voronoi mesh 400. The neighbor identification module 114 then identifies a seed 414 that is closest to the end-point 408 of the spoke 404. In an example, the neighbor identification module 114 identifies the seed 414 by executing a nearest-neighbor search over seeds of the Voronoi mesh 400. Once the neighbor identification module 114 has identified the seed 414 nearest the end-point 408 of the spoke 404, the neighbor identification module 114 constructs a hyperplane 416 that bisects a line segment 418 that extends between the first seed 406 and the seed 414 closest to the end-point 408 of the spoke 404. The neighbor identification module 114 identifies a point of intersection 420 between the spoke 404 and the hyperplane 416, and identifies a seed 422 that is closest to the point of intersection 420. The neighbor identification module 114 then determines whether the seed 422 that is closest to the point of intersection 420 and the seed 414 that is closest to the end-point 408 of the spoke 404 are the same seed. Since the seeds 414 and 422 are not the same seed, the neighbor identification module 114 then trims the spoke 404, so that the spoke 404 extends from the first seed 406 to the point of intersection 420 between the spoke 404 and the hyperplane 416.

Referring now solely to FIG. 5, the exemplary Voronoi mesh 400 of the domain 402 is illustrated, wherein the spoke 404 has been trimmed to the point of intersection 420 of the spoke 404 and the hyperplane 416. The point of intersection 420 is the end-point of the spoke 404 after the trimming, and so after the trimming the seed 422 is the seed closest to the end-point 420 of the spoke 404. The neighbor identification module 114 then constructs a new hyperplane 502 that bisects a segment 504 that extends between the first seed 406 and the seed 422 that is closest to the end-point 420 of the spoke 404. The neighbor identification module 114 identifies a new point of intersection 506 between the new hyperplane 502 and the trimmed spoke 404. A seed 508 closest to the point of intersection 506 between the hyperplane 502 and the trimmed spoke 404 is identified, and the neighbor identification module 114 determines whether the seed 422 closest to the end point 420 and the seed 508 closest to the point of intersection 506 are the same seed. Since the seeds 422 and 508 are not the same seed (as evidenced by the fact that they do not reside within the same Voronoi cell, as shown in FIG. 5), the neighbor identification module 114 again trims the spoke 404 to the point of intersection 506.

Referring now solely to FIG. 6, the exemplary Voronoi mesh 400 of the domain 402 is illustrated, wherein the spoke 404 has been twice-trimmed, such that the new end-point of the spoke is the point of intersection 506 of the spoke 404 and the hyperplane 502. The seed 508 is identified as the seed nearest the end-point 506 of the twice-trimmed spoke 404. A new hyperplane 602 is constructed, the hyperplane 602 bisecting a segment 604 that spans the distance between the first seed 406 and the seed 508. A point of intersection 606 between the hyperplane 602 and the spoke 404 is identified. The point of intersection 606 lies on a facet 608 of the Voronoi cell 412, the facet 608 comprising points in the domain 402 equidistant to the first seed 406 and the seed 508. Thus, the neighbor identification module 114 identifies the seeds 406 and 508 as being the seeds closest to the point of intersection 606. Since at least one of the seeds 406 and 508 is the same seed 508 that is closest to the end-point 506 of the twice-trimmed spoke 404, the neighbor identification module 114 labels the first seed 406 and the seed 508 as neighbors. Since the point 606 lies on the facet 608, it is equidistant to the seeds 406 and 508. Thus, the point 606 can be considered a "witness" point indicating that the seeds 406 and 508 are neighbor seeds.

Figure 7:
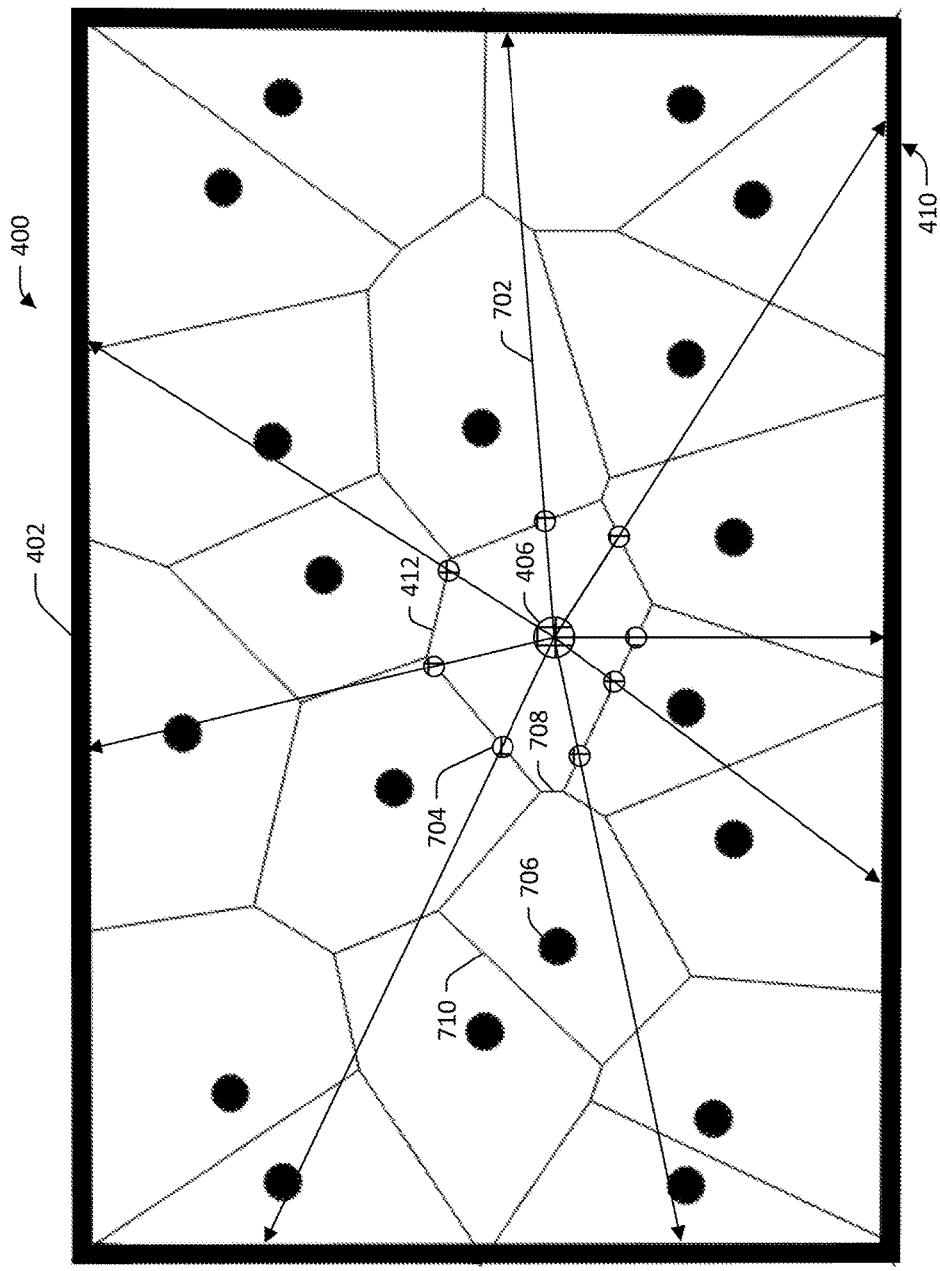
FIG. 7 is a diagram depicting exemplary results of operations performed by a computing device to identify neighbor seeds in an implicitly-defined Voronoi mesh of an enclosed domain.

The methodology 300 can be repeated a plurality of times in order to identify multiple neighbor seeds of the seed 406. For example, in each of a plurality of iterations of the methodology 300, a spoke can be extended in a different random direction, and the spoke successively trimmed until 1) the end-point of the spoke and 2) the intersection point of the spoke and the hyperplane that bisects the distance between the origin seed and the end-point seed are closer to a same seed than any other seed. In each iteration, a different witness point is located, wherein the witness points are points on facets of the Voronoi cell 412 of the first seed 406. By way of example, and referring now to FIG. 7, a plurality of spokes 702 are extended in a random plurality of directions from the seed 406 in the Voronoi mesh 400 of the enclosed domain 402. Each of the spokes 702 intersects a facet of the Voronoi cell 412 such that a plurality of witness points 704 are identified, wherein each of the witness points 704 indicates a neighbor relationship between the first seed 406 and another seed. If the methodology 300 is repeated an infinite number of times, every neighbor seed of the seed 406 will be identified. If the methodology 300 is repeated a finite number of times, it is possible that neighbor seeds whose cells share relative small facets with the cell 412 will be missed, and not labeled as neighbors of the seed 406. For example, as shown in FIG. 7, the seed 706 is not identified as a neighbor of the seed 406 because none of the spokes 702 pass through the facet 708 that separates the cell 412 from the cell 710 corresponding to the seed 706.

In order to ensure that every neighbor seed of a given seed in a Voronoi mesh of a d-dimensional domain is identified, once a witness point on a (d−1)-dimensional facet of a Voronoi cell is identified, the witness point can be used to constrain further hyperplane sampling. For example, a witness point on a (d−1)-dimensional facet of a Voronoi cell can be identified by the neighbor identification module 114 in connection with performing the methodology 300. A spoke can then be extended along the facet by the neighbor identification module 114 to identify another witness point, wherein the spoke is constrained to the (d−1)-dimensional space of the facet. The witness point identified by the (d−1)-dimensionally constrained spoke lies on a (d−2)-dimensional facet of the Voronoi cell.

Figure 8:
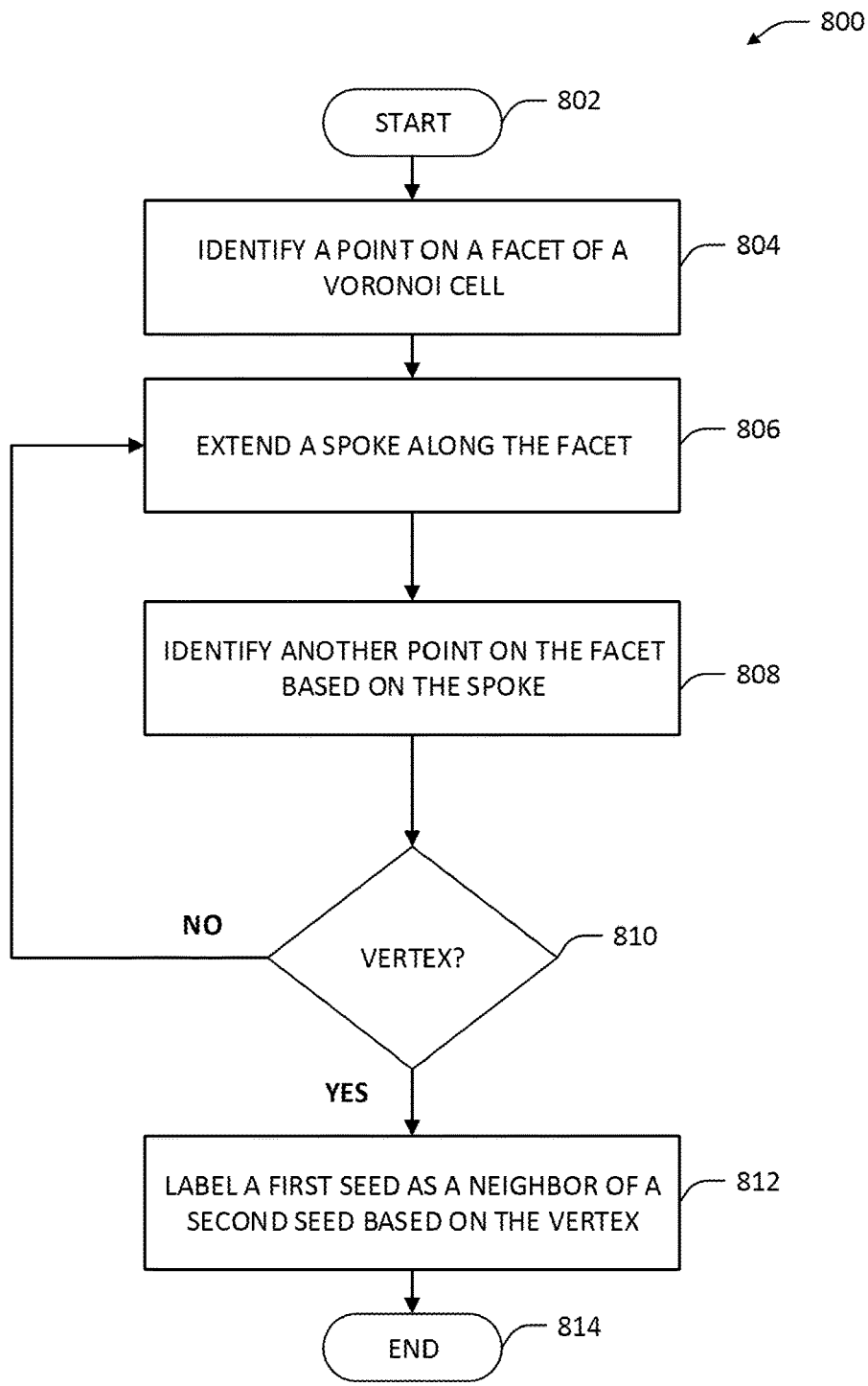
FIG. 8 is a flow diagram that illustrates an exemplary methodology for labeling seeds in an implicitly-defined Voronoi mesh as neighbors based on identifying a Voronoi vertex.

Referring now to FIG. 8, a methodology 800 that is performed by the computing device 100 in connection with identifying vertices of a Voronoi cell in an implicitly-defined Voronoi mesh of a domain of arbitrarily many dimensions is illustrated. The methodology 800 begins at 802 and at 804 a point on a facet of a Voronoi cell is identified. In an example, the point can be identified based upon the methodology 300 for hyperplane sampling of an implicitly-defined Voronoi mesh described above with respect to FIG. 3. In the example, the point is identified at 804 by successively trimming a spoke that extends through the d-dimensional space of the domain until a point is found that is on a (d−1)-dimensional facet of the Voronoi cell. At 806, a spoke is extended along the (d−1)-dimensional facet and is thus constrained to the (d−1)-dimensional space of the facet. At 808, another point is identified on the facet based on the spoke extended at 806. Again, in an example, the point can be identified at 808 based upon the method of hyperplane sampling described above with respect to the methodology 300. Since the spoke extended at 806 is constrained to the (d−1)-dimensional space of the facet, the point identified at 808 lies on a (d−2) dimensional portion of the facet. At 810, a determination is made as to whether the point identified at 808 is a vertex of the Voronoi cell. If the point is a vertex, a first seed is labeled as a neighbor of a second seed based on the vertex at 812, wherein the first seed and the second seed are seeds of Voronoi cells that share the vertex, and the methodology ends 814.

If the point is not a vertex, then the methodology 800 returns to 806, and another spoke is extended along the facet. The steps 806-808 of the methodology 800 are repeated until the point identified at 808 is determined to be a vertex at 810, whereupon two seeds are labeled as neighbors based on the vertex 812 and the methodology ends 814. Each time a new spoke is extended along the facet, the spoke is constrained to a (d−n) portion of the facet, where n is a number of iterations of extending a spoke. As spokes are extended and points successively identified, a dimensionality in which the point is constrained to lie decreases by one in each iteration. By way of example in a three-dimensional domain, a spoke is extended from the seed of a three-dimensional polyhedral Voronoi cell, where the spoke extends through three-dimensions of the domain. Based on the spoke, a point that lies on a two-dimensional facet of the Voronoi cell is identified. Continuing the three-dimensional example, a second spoke is extended along the two-dimensional facet on which the point lies. In the example, the second spoke passes through a 1-dimensional facet (e.g., a line segment forming an edge of the Voronoi cell) of the Voronoi cell, and a second point is identified based on the spoke that travels along the two-dimensional facet, where the second point lies on the 1-dimensional facet. Still continuing the example, a third spoke is extended, wherein the third spoke is constrained to travel along the 1-dimensional edge of the Voronoi cell on which the second point lies. A third point can be identified based on the third spoke. The third point lies on a 0-dimensional facet of the Voronoi cell, which will be a vertex. Thus, the third point is a vertex, and neighbors of the Voronoi cell and its seed can be identified based on the vertex.

Figure 9:
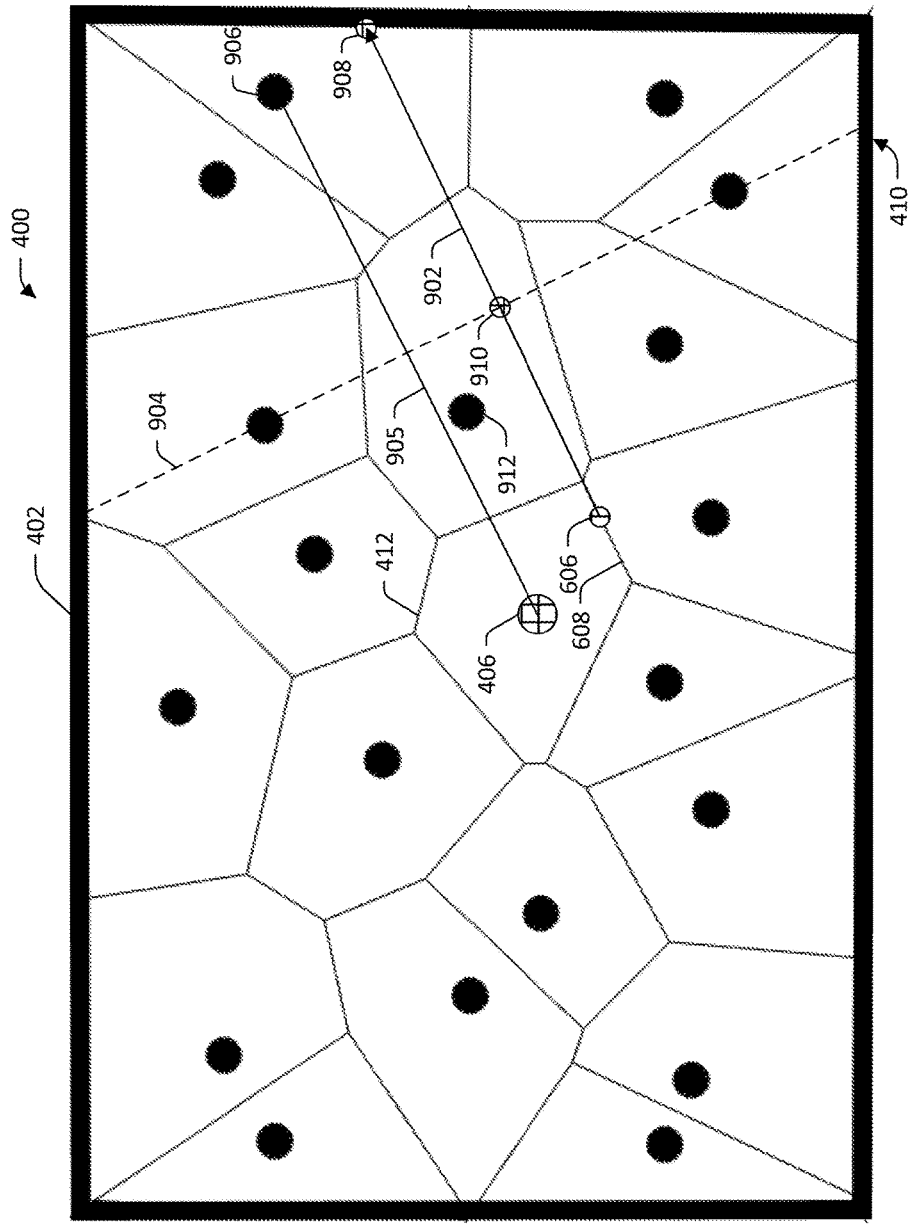
FIG. 9 is a diagram illustrating certain exemplary operations performed by a computing device in connection with labeling seeds as neighbors based on identifying a Voronoi vertex.
Figure 10:
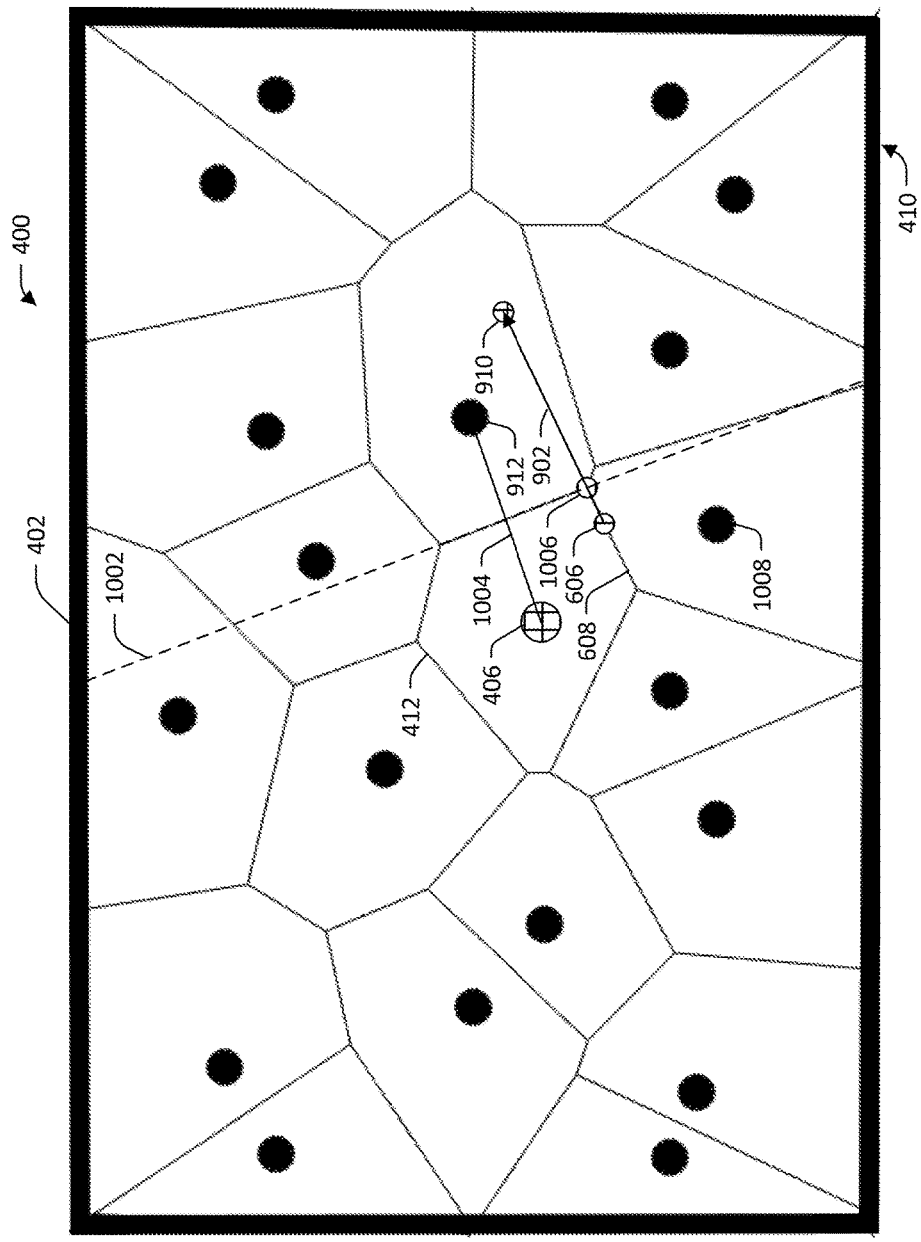
FIG. 10 is a diagram illustrating certain further exemplary operations performed by a computing device in connection with labeling seeds as neighbors based on identifying a Voronoi vertex.

Referring now to FIGS. 9-10, exemplary diagrams that depict operation of the methodology 800 with respect to the enclosed two-dimensional domain 402 are illustrated. Referring now specifically to FIG. 9, the Voronoi mesh 400 of the two-dimensional domain 402 is illustrated wherein the point 606 has been identified as lying on the one-dimensional facet 608 of the Voronoi cell 412. The neighbor identification module 114 extends a spoke 902 along the facet 608 to the boundary 410 of the domain 402. The neighbor identification module 114 then performs spoke trimming to identify a point on a zero-dimensional facet (vertex) of the Voronoi cell 412. The neighbor identification module 114 constructs a hyperplane 904 that bisects a segment 905 spanning the distance between the seed 406 (corresponding to the Voronoi cell 412 of the facet 608 on which the point 606 lies) and the seed 906 that is closest to the end-point 908 of the spoke 902. The neighbor identification module 114 identifies a point of intersection 910 of the hyperplane 904 and the spoke 902, and determines whether the seed 906 that is closest to the end-point 908 of the spoke 902 is the same as the seed 912 that is closest to the point of intersection 910. Since the seeds 906 and 912 are not the same seed, the neighbor identification module 114 trims the spoke 902 to the point of intersection 910. Referring now to FIG. 10, an exemplary diagram of the Voronoi mesh 400 of the two-dimensional domain 402 is illustrated wherein the spoke 902 has been trimmed to the point of intersection 910 of the hyperplane 904 and the spoke 902. The neighbor identification module 114 constructs a new hyperplane 1002 that bisects a segment 1004 that extends between the seed 406 and the seed 912 that is closest to the point 910, which is the end-point of the trimmed spoke 902. The hyperplane 1002 intersects the spoke 902 at a point 1006 that lies on the facet 608 of the Voronoi cell 412. The seed 912 is one of three seeds (along with 406 and 1008) to which the point 1006 is closest, and so the end-point 910 of the spoke 902 and the point of intersection 1006 between the hyperplane 1002 and the segment 1004 are closest to the same seed 912. Thus, the neighbor identification module 114 identifies the point 1006 as being on a facet of the Voronoi cell 412. The neighbor identification module 114 further identifies the point 1006 as being on a vertex of the Voronoi cell 412, since the point 1006 was identified based on the spoke 902 that extends along the one-dimensional facet 608 of the Voronoi cell 412. Based on the point 1006 being identified as being a vertex of the Voronoi cell 412, the seed 406 of the cell 412 can be identified as being a neighbor of the seed 912 and a seed 1008, wherein the seeds 406, 912, 1008 are seeds equidistant to the vertex 1006.

Figure 11:
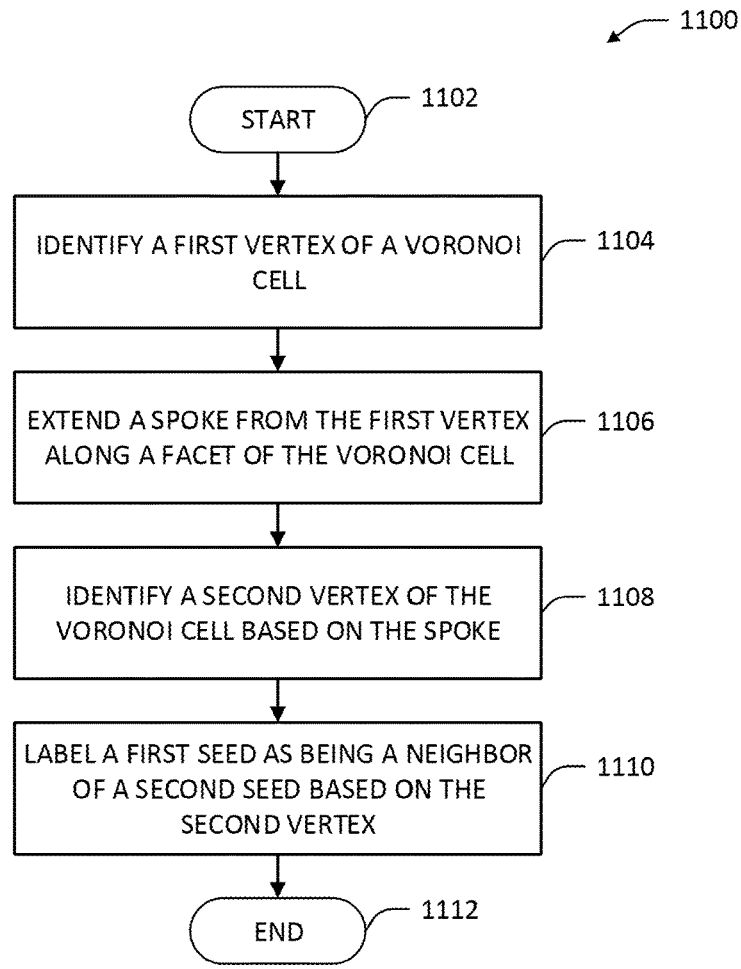
FIG. 11 is a flow diagram that illustrates an exemplary methodology for identifying additional vertices of a Voronoi cell based on a first vertex of the Voronoi cell.

Referring now to FIG. 11, an exemplary methodology 1100 that is performed by the computing device in connection with identifying additional vertices of a Voronoi cell once a first vertex has been identified is illustrated. The methodology 1100 begins at 1102 and at 1104 a first vertex of a Voronoi cell is identified. In an example, the first vertex can be identified based on the methodology 800, wherein spokes are successively extended along a facet of the Voronoi cell and constrained in each successive iteration to traverse a space of one less dimension than the spoke in a previous iteration. At 1106, a spoke is extended from the first vertex along a facet of the Voronoi cell to the boundary of the domain. By way of example, the spoke can be extended from the first vertex along a one-dimensional edge of the Voronoi cell on which the first vertex lies. At 1108, a second vertex of the Voronoi cell is identified based on the spoke extended at 1106. For example, after extending the spoke from the first vertex along the one-dimensional edge of the Voronoi cell, the spoke can be successively trimmed by hyperplanes in accordance with the methodology 300 until the end-point of the spoke lies on a facet of the Voronoi cell. If the spoke is constrained to the one-dimensional space along the one-dimensional edge of the Voronoi cell, the end-point of the trimmed spoke will lie on a zero-dimensional facet of the Voronoi cell (i.e., a vertex). At 1110, a first seed is labeled as being a neighbor of a second seed based on the second vertex. The methodology 1100 completes at 1116.

Figure 12:
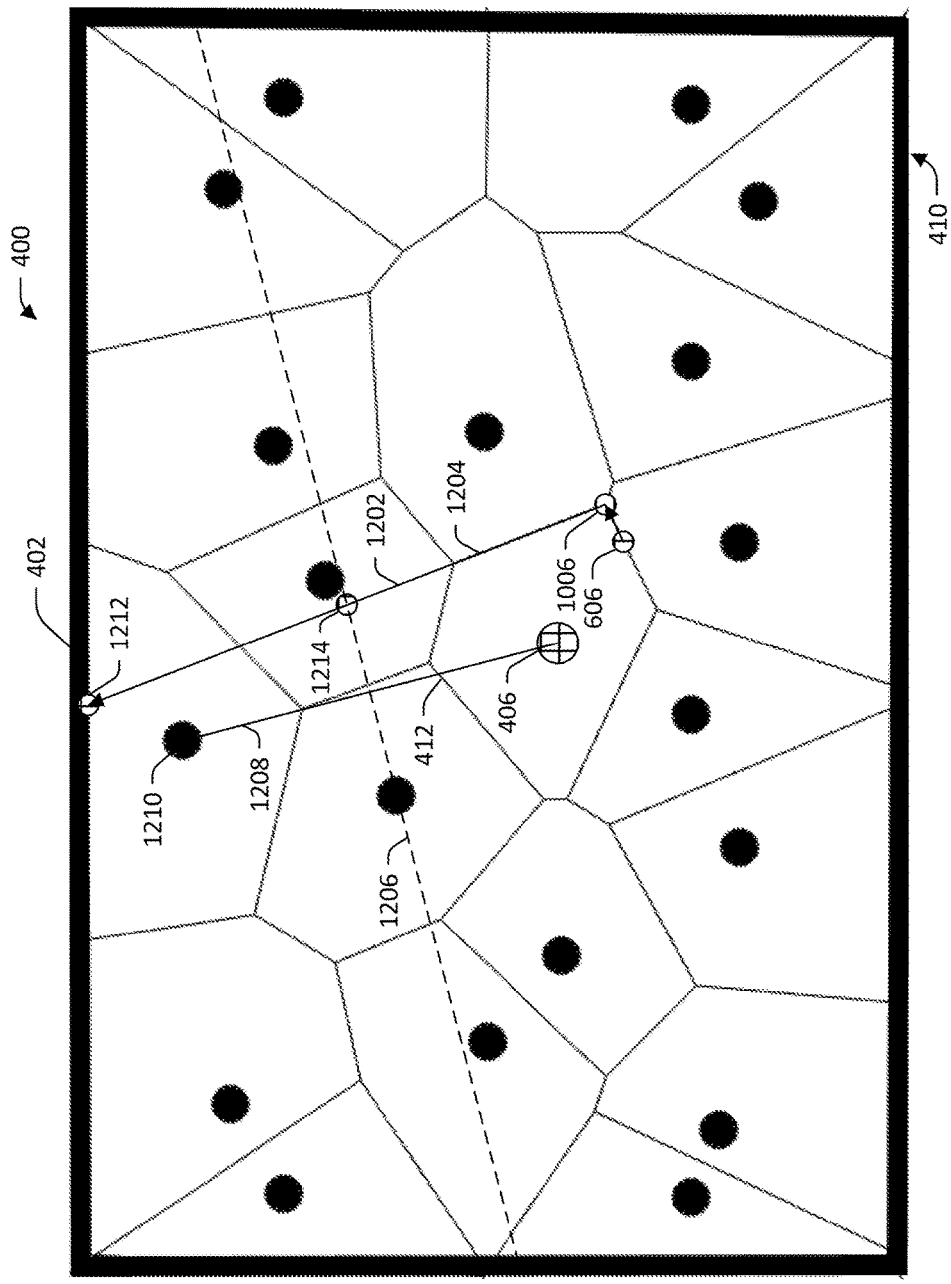
FIG. 12 is a diagram illustrating certain exemplary operations performed by a computing device in connection with identifying additional vertices of a Voronoi cell based on a first vertex of the Voronoi cell.
Figure 13:
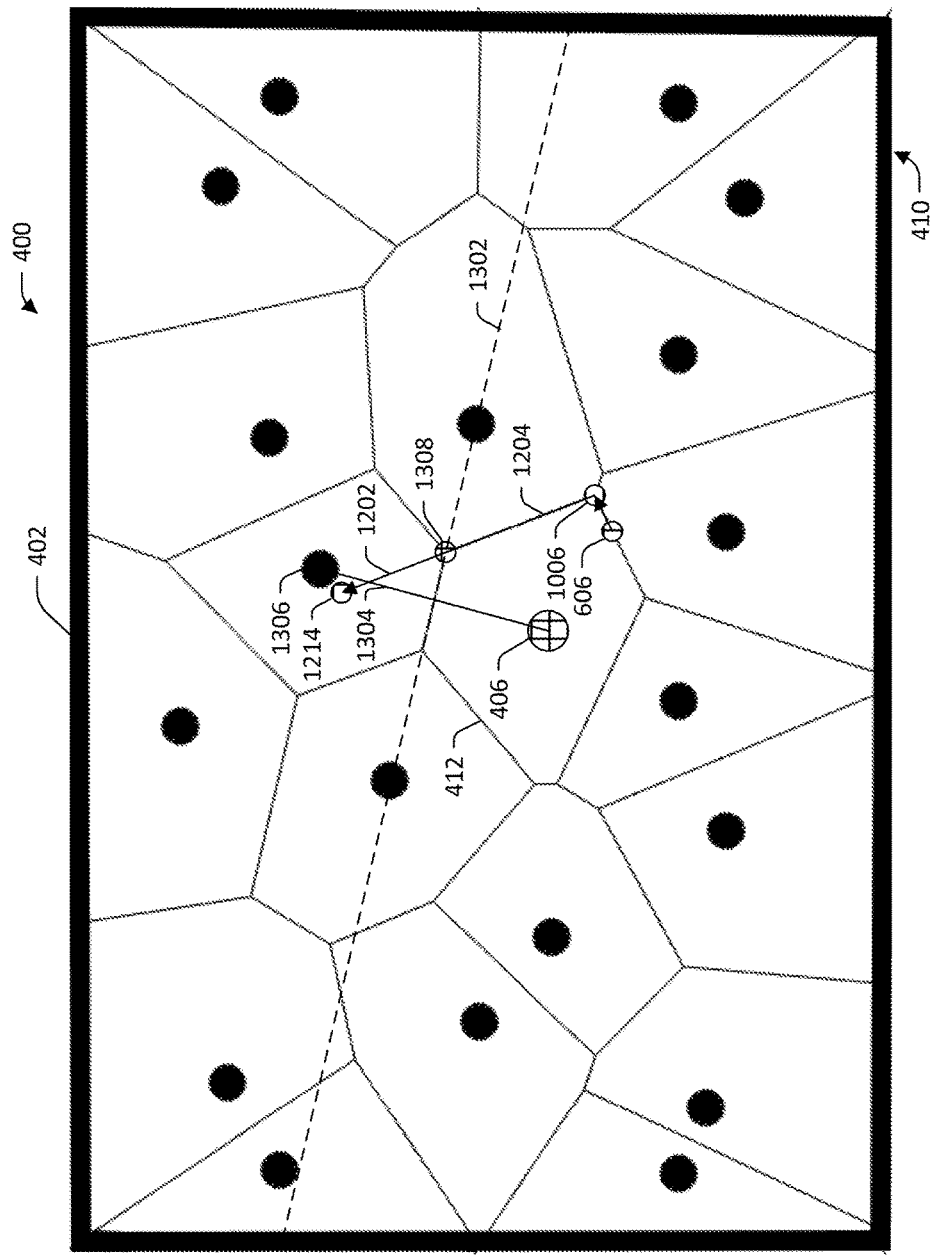
FIG. 13 is a diagram illustrating certain further exemplary operations performed by a computing device in connection with identifying additional vertices of a Voronoi cell based on a first vertex of the Voronoi cell.

Referring now to FIGS. 12 and 13, exemplary diagrams that depict operation of the methodology 1100 in an exemplary embodiment in connection with identifying a second vertex of a Voronoi cell are illustrated. FIGS. 12 and 13 illustrate the exemplary Voronoi mesh 400 of the two-dimensional domain 402, wherein a first vertex 1006 of the Voronoi cell 412 has been identified. Referring now solely to FIG. 12, the neighbor identification module 114 extends a spoke 1202 from the first vertex 1006 along a one-dimensional edge 1204 of the Voronoi cell 412, wherein the first vertex 1006 lies on the edge 1204. The neighbor identification module 114 then constructs a hyperplane 1206 that bisects a segment 1208 that spans the distance between the seed 406 of the Voronoi cell 412 and the seed 1210 that is closest to an endpoint 1212 of the spoke 1202. The hyperplane 1206 intersects the spoke 1202 at a point 1214. Since the endpoint 1212 of the spoke 1202 and the intersection point 1214 between the spoke 1202 and the hyperplane 1206 are not closest to the same seed, the neighbor identification module 114 trims the spoke 1202 to the intersection point 1214.

Referring now to FIG. 13, after the trimming, the spoke 1202 ends at the former point of intersection 1214 with the hyperplane 1206. The neighbor identification module 114 constructs a second hyperplane 1302 that bisects a segment 1304 that spans the distance between the seed 406 and a seed 1306 that is closest to the endpoint 1214 of the trimmed spoke. The hyperplane 1302 intersects the spoke 1202 at a point 1308. Since the intersection point 1308 of the hyperplane 1302 and the spoke 1202 are both closest to the same seed 1306 (i.e., within or on the boundary of the Voronoi cell of the seed 1306), the point 1308 is identified as being a vertex of the Voronoi cell 412.

Figure 14:
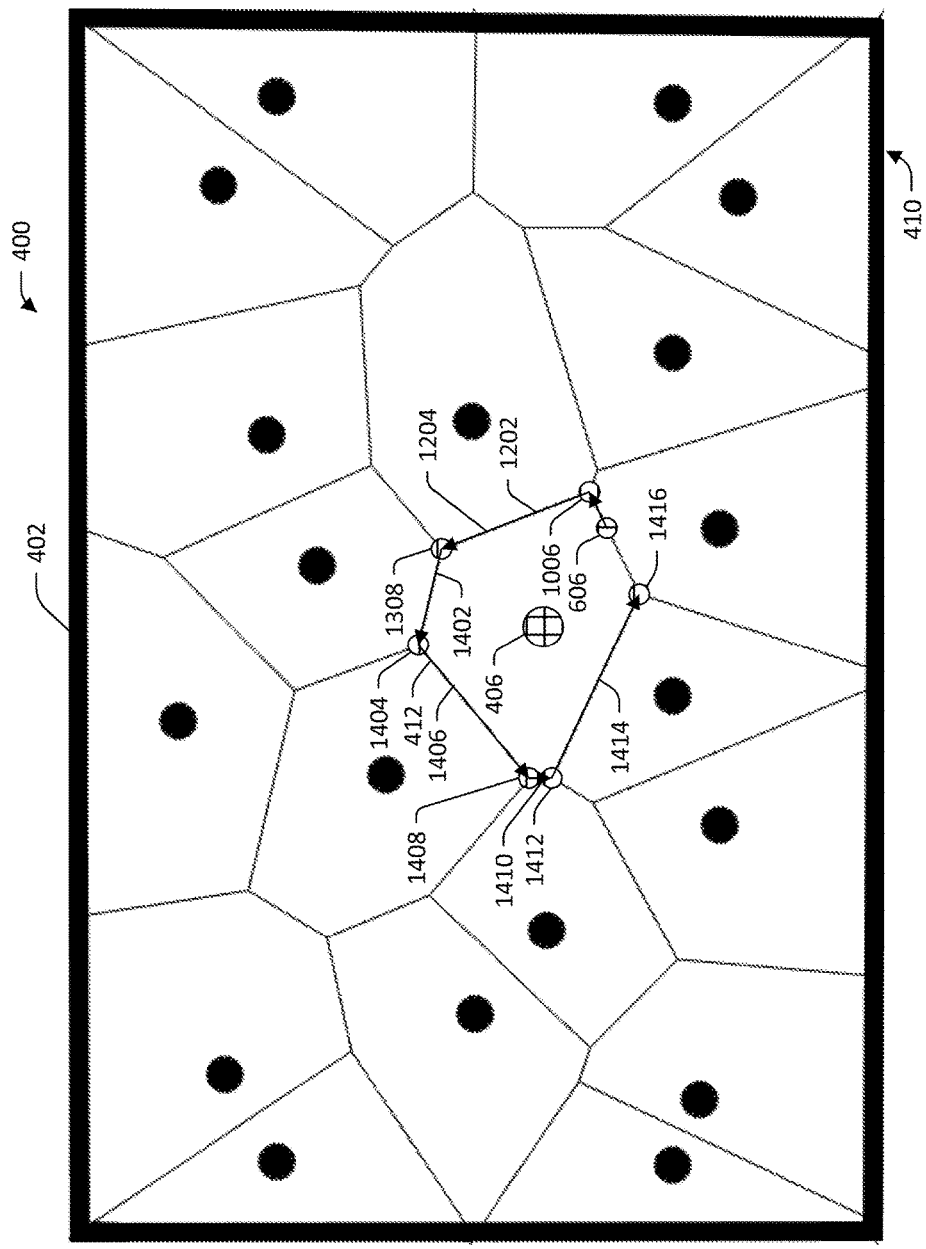
FIG. 14 is a diagram depicting exemplary results of operations performed by a computing device in connection with identifying additional vertices of a Voronoi cell based on a first vertex of the Voronoi cell.

Referring now to FIG. 14, an exemplary diagram that depicts operation of the methodology 1100 in connection with identifying all vertices of a Voronoi cell is illustrated. The methodology 1100 can be repeated a plurality of times to identify all vertices of a Voronoi cell. The exemplary diagram of FIG. 14 shows the exemplary Voronoi mesh 400 of the exemplary two-dimensional domain 402, wherein vertices of the seed 406 are identified based on spokes extended from previously identified vertices along edges of the Voronoi cell. For example, and as described above with respect to FIGS. 12 and 13, the neighbor identification module 114 extends the spoke 1202 from the vertex 1006 along the edge 1204 of the Voronoi cell 412 to identify the second vertex 1308. Similarly, the neighbor identification module 114 extends another spoke 1402 from the vertex 1308 to identify a third vertex 1404, a spoke 1406 from the vertex 1404 to identify a fourth vertex 1408, a spoke 1410 from the vertex 1408 to identify a fifth vertex 1412, and a spoke 1414 from the vertex 1412 to identify a sixth vertex 1416. The methodology 1100 can be repeated at each of the vertices 1006, 1308, 1404, 1408, 1412, 1416 until a spoke reaches a vertex previously identified as being a vertex of the cell 412 (e.g., a spoke is extended from vertex 1416 to identify previously-identified vertex 1006).

The spoke-trimming operations described above can be performed by the computing device 100 to efficiently identify vertices of Voronoi cells based on the implicit Voronoi mesh definition 112, and thence to label Voronoi seeds or Voronoi cells as neighbors of one another. The technologies described herein allow the computing device 100 to rapidly identify a subset of vertices of Voronoi cells in the implicit Voronoi mesh, where the subset of vertices comprises a set of vertices of interest for a particular numerical simulation to be performed by the numerical simulator module 109.

Figure 15:
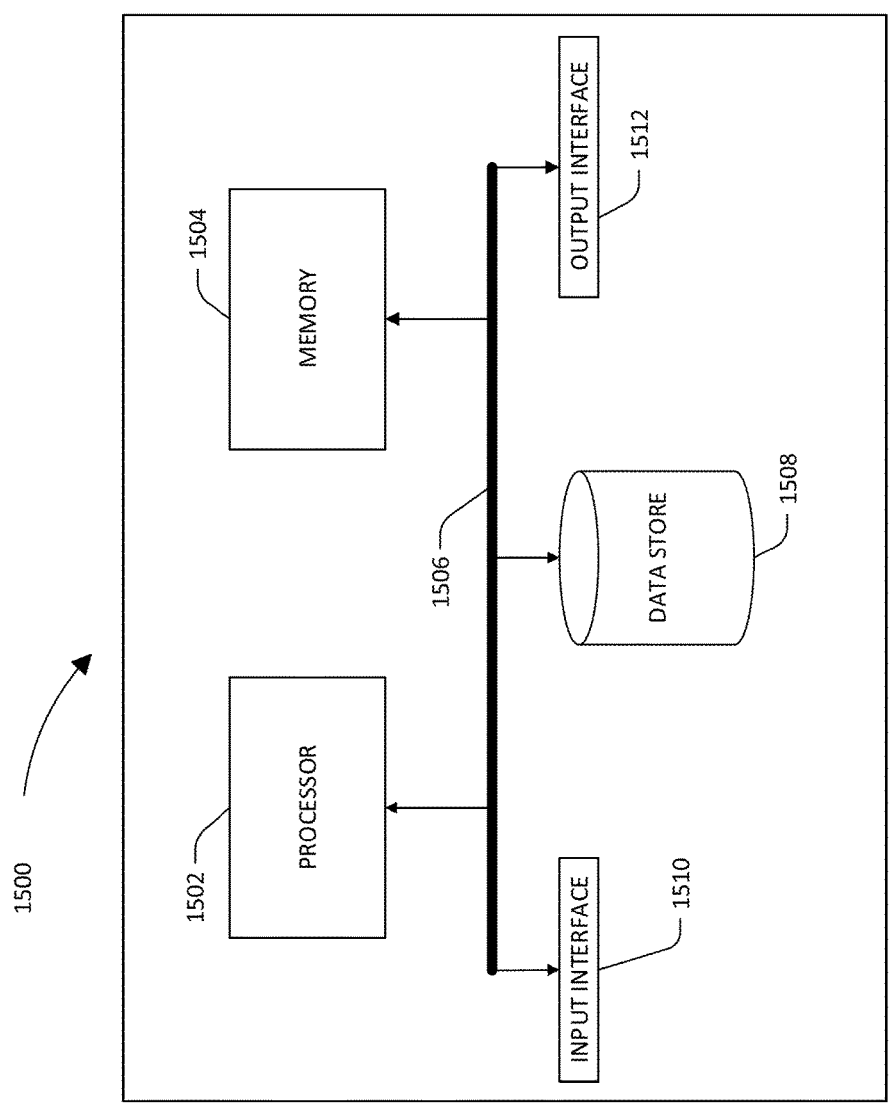
FIG. 15 is an exemplary computing system.

Referring now to FIG. 15, a high-level illustration of an exemplary computing device 1500 that can be used in accordance with the systems and methodologies disclosed herein is illustrated. For instance, the computing device 1500 may be used in a system that is configured to perform numerical simulations. By way of another example, the computing device 1500 can be used in a system that labels neighbor seeds based on an implicit definition of a conforming Voronoi mesh. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory 1504 by way of a system bus 1506. In addition to storing executable instructions, the memory

1504 may also store locations of seeds in a domain, Voronoi meshes, definitions of enclosed domains, etc.

The computing device 1500 additionally includes a data store 1508 that is accessible by the processor 1502 by way of the system bus 1506. The data store 1508 may include executable instructions, numerical simulation results, etc. The computing device 1500 also includes an input interface 1510 that allows external devices to communicate with the computing device 1500. For instance, the input interface 1510 may be used to receive instructions from an external computer device, from a user, etc. The computing device 1500 also includes an output interface 1512 that interfaces the computing device 1500 with one or more external devices. For example, the computing device 1500 may display text, images, etc. by way of the output interface 1512.

It is contemplated that the external devices that communicate with the computing device 1500 via the input interface 1510 and the output interface 1512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1500 may be a distributed system. Thus, for instance, several devices may be in communication by way of a network connection and may collectively perform tasks described as being performed by the computing device 1500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
    a processor; and
    memory storing instructions that, when executed by the processor, cause the processor to perform acts comprising:
        receiving a computer-implemented implicit definition of a Voronoi mesh for an enclosed domain of greater than three dimensions, wherein the Voronoi mesh is bounded by the enclosed domain;
        labeling a first seed of the Voronoi mesh as a neighbor of a second seed of the Voronoi mesh based upon hyperplane sampling of the Voronoi mesh; and
        performing a numerical simulation to generate simulation results, wherein the numerical simulation is based upon the first Voronoi seed and the second Voronoi seed being neighbors.

2. The computing system of claim 1, wherein the computer-implemented implicit definition of the Voronoi mesh comprises locations of a plurality of seeds, each seed in the seeds corresponding to a respective Voronoi cell in the Voronoi mesh.

3. The computing system of claim 1, wherein labeling the first seed as a neighbor of the second seed comprises:
    extending a spoke from the first seed to the boundary of the enclosed domain;
    identifying a seed closest to an end point of the spoke;
    identifying a seed closest to an intersection point between the spoke and a hyperplane that bisects a distance between the first seed and the seed closest to the endpoint of the spoke;
    determining whether the seed closest to the endpoint of the spoke and the seed closest to the point of intersection are the same seed; and
    responsive to determining that the seed closest to the end of the spoke and the seed closest to the point of intersection are the same seed, labeling the seed closest to the endpoint of the spoke as a neighbor of the first seed.

4. The computing system of claim 3, the acts further comprising responsive to determining that the seed closest to the endpoint of the spoke and the seed closest to the point of intersection are not the same seed:
   trimming the spoke to the point of intersection between the hyperplane and the spoke; and
   repeating the acts of identifying, determining, and trimming until it is determined that the seed closest to the endpoint of the spoke and the seed closest to the point of intersection are the same seed.

5. The computing system of claim 3, the acts further comprising: responsive to determining that the seed closest to the endpoint of the spoke and the seed closest to the point of intersection are the same seed, labeling the point of intersection as being on a facet of a first Voronoi cell, the first Voronoi cell corresponding to the first seed.

6. The computing system of claim 5, the acts further comprising labeling a second point as being a vertex of the first Voronoi cell based on the point of intersection labeled as being on the facet of the first Voronoi cell, wherein the numerical simulation is based further on the second point being a vertex of the first Voronoi cell.

7. The computing system of claim 6, wherein labeling the second point as being a vertex of the first Voronoi cell comprises:
   extending a second spoke from the point of intersection along the facet to the boundary of the enclosed domain; and
   labeling the second point as being the vertex of the first Voronoi cell based on the second spoke.

8. The computing system of claim 7, wherein labeling the second point as being the vertex of the first Voronoi cell based on the second spoke comprises:
   identifying a second point of intersection between the second spoke and a second hyperplane that bisects a distance between the first seed and a seed closest to the end of the second spoke;
   determining whether the seed closest to the end of the second spoke and the seed closest to the second point of intersection are the same seed; and
   responsive to determining that the seed closest to the end of the second spoke and the seed closest to the second point of intersection are the same seed, labeling the second point of intersection as the vertex of the first Voronoi cell, wherein the second point is the second point of intersection.

9. The computing system of claim 8, the acts further comprising: responsive to determining that the seed closest to the end of the second spoke and the seed closest to the second point are not the same seed:
   trimming the second spoke to the second point of intersection; and
   repeating the acts of identifying the second point of intersection, determining whether the seed closest to the end of the second spoke and the seed closest to the second point of intersection are the same seed, and trimming the second spoke to the second point of intersection until determining that the seed closest to the end of the second spoke and the seed closest to the second point of intersection are the same seed.

10. The computing system of claim 6, the acts further comprising labeling a third point as being a second vertex of the first Voronoi cell based on the second point.

11. A computing device configured to perform the following acts
   receiving, at a processor of the computing device, a computer-implemented implicit definition of a Voronoi mesh for an enclosed domain of greater than three dimensions, wherein the Voronoi mesh is bounded by the enclosed domain;
   labeling, by the processor of the computing device, a first seed of the Voronoi mesh as a neighbor of a second seed of the Voronoi mesh based upon hyperplane sampling of the Voronoi mesh; and
   performing, by the processor of the computing device, a numerical simulation to generate simulation results, wherein the numerical simulation is based upon the first Voronoi seed and the second Voronoi seed being neighbors.

12. The computing device of claim 11, wherein labeling the first seed as a neighbor of the second seed comprises:
   extending a spoke from the first seed to the boundary of the enclosed domain;
   identifying a seed closest to an end point of the spoke;
   identifying a seed closest to an intersection point between the spoke and a hyperplane that bisects a distance between the first seed and the seed closest to the endpoint of the spoke;
   determining whether the seed closest to the endpoint of the spoke and the seed closest to the point of intersection are the same seed; and
   responsive to determining that the seed closest to the end of the spoke and the seed closest to the point of intersection are the same seed, labeling the seed closest to the endpoint of the spoke as a neighbor of the first seed.

13. The computing device of claim 12, the acts further comprising: responsive to determining that the seed closest to the endpoint of the spoke and the seed closest to the point of intersection are the same seed, labeling the point of intersection as being on a facet of a first Voronoi cell, the first Voronoi cell corresponding to the first seed.

14. The computing device of claim 13, the acts further comprising labeling a second point as being a vertex of the first Voronoi cell based on the point of intersection labeled as being on the facet of the first Voronoi cell, wherein the numerical simulation is based further on the second point being a vertex of the first Voronoi cell.

15. The computing device of claim 14, wherein labeling the second point as being a vertex of the first Voronoi cell comprises:
   extending a second spoke from the point of intersection along the facet to the boundary of the enclosed domain; and
   labeling the second point as being the vertex of the first Voronoi cell based on the second spoke.

16. The computing device of claim 14, further comprising labeling a third point as being a second vertex of the first Voronoi cell based on the second point.

17. A non-transitory computer-readable storage medium comprising instructions that, when executed by a processor, cause the processor to perform the following acts:
   receiving a computer-implemented implicit definition of a Voronoi mesh for an enclosed domain of greater than three dimensions, wherein the Voronoi mesh is bounded by the enclosed domain;
   labeling a first seed of the Voronoi mesh as a neighbor of a second seed of the Voronoi mesh based upon hyperplane sampling of the Voronoi mesh; and performing a numerical simulation to generate simulation results, wherein the numerical simulation is based upon the first Voronoi seed and the second Voronoi seed being neighbors.

18. The non-transitory computer-readable storage medium of claim 17, wherein labeling the first seed as a neighbor of the second seed comprises:
extending a spoke from the first seed to the boundary of the enclosed domain;
identifying a seed closest to an end point of the spoke;
identifying a seed closest to an intersection point between the spoke and a hyperplane that bisects a distance between the first seed and the seed closest to the endpoint of the spoke;
determining whether the seed closest to the endpoint of the spoke and the seed closest to the point of intersection are the same seed; and
responsive to determining that the seed closest to the end of the spoke and the seed closest to the point of intersection are the same seed, labeling the seed closest to the endpoint of the spoke as a neighbor of the first seed.

19. The non-transitory computer-readable storage medium of claim 18, further comprising: responsive to determining that the seed closest to the endpoint of the spoke and the seed closest to the point of intersection are the same seed, labeling the point of intersection as being on a facet of a first Voronoi cell, the first Voronoi cell corresponding to the first seed.

20. The non-transitory computer-readable storage medium of claim 19, further comprising labeling a second point as being a vertex of the first Voronoi cell based on the point of intersection labeled as being on the facet of the first Voronoi cell, wherein the numerical simulation is based further on the second point being a vertex of the first Voronoi cell.

* * * * *